United States Patent
Rhee et al.

(10) Patent No.: US 10,776,494 B2
(45) Date of Patent: Sep. 15, 2020

(54) METHOD FOR VERIFYING FORGERY AND FALSIFICATION OF EXECUTABLE FILE IN IMAGE FORMING APPARATUS AND IMAGE FORMING APPARATUS USING SAME

(71) Applicant: HEWLETT-PACKARD DEVELOPMENT COMPANY, L.P., Spring, TX (US)

(72) Inventors: Hyun-sook Rhee, Suwon-si (KR); Kang-hee Lim, Suwon-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/230,817

(22) Filed: Dec. 21, 2018

(65) Prior Publication Data

US 2019/0121984 A1 Apr. 25, 2019

Related U.S. Application Data

(63) Continuation of application No. PCT/KR2017/006810, filed on Jun. 28, 2017.

(30) Foreign Application Priority Data

Jun. 29, 2016 (KR) .................. 10-2016-0081762

(51) Int. Cl.
*G06F 21/57* (2013.01)
*H04N 1/00* (2006.01)
(Continued)

(52) U.S. Cl.
CPC ............ *G06F 21/575* (2013.01); *G06F 21/51* (2013.01); *G06F 21/572* (2013.01); *G06F 21/608* (2013.01); *G06F 21/64* (2013.01); *H04L 9/0643* (2013.01); *H04L 9/0877* (2013.01); *H04L 9/0891* (2013.01); *H04L 9/0897* (2013.01); *H04L 9/3247* (2013.01); *H04N 1/00244* (2013.01); *H04N 1/00928* (2013.01); *H04N 1/00938* (2013.01); *G06F 9/4401* (2013.01); *G06F 2221/033* (2013.01);
(Continued)

(58) Field of Classification Search
CPC combination set(s) only.
See application file for complete search history.

(56) References Cited

U.S. PATENT DOCUMENTS 8,140,786 B2 * 3/2012 Bunte ................. G06F 11/1451
711/161
9,294,282 B1 * 3/2016 Potlapally ............. H04L 9/3236
(Continued)

FOREIGN PATENT DOCUMENTS

JP 2009-129061 A 6/2009
KR 10-2015-0122267 A 10/2015

*Primary Examiner* — Helen Zong
(74) *Attorney, Agent, or Firm* — Jefferson IP Law, LLP

(57) ABSTRACT

An image forming apparatus and method for verifying forgery or falsification of an execution file by using a trusted platform module configured to generate an encryption key are provided. The method includes generating the encryption key by using a hash value for an operating system (OS) kernel image, the generating being performed by the trusted platform module, and verifying forgery or falsification of the execution file based on the generated encryption key.

11 Claims, 10 Drawing Sheets

(51) Int. Cl.

| | | |
|---|---|---|
| *H04L 9/08* | (2006.01) | |
| *G06F 21/64* | (2013.01) | |
| *H04L 9/06* | (2006.01) | |
| *G06F 21/51* | (2013.01) | |
| *H04L 9/32* | (2006.01) | |
| *G06F 21/60* | (2013.01) | |
| *G06F 9/4401* | (2018.01) | |

(52) U.S. Cl.
CPC ........ *H04L 9/0894* (2013.01); *H04L 2209/38* (2013.01); *H04N 2201/0094* (2013.01)

(56) References Cited

U.S. PATENT DOCUMENTS

| | | | |
|---|---|---|---|
| 2003/0188179 A1* | 10/2003 | Challener | ............... G06F 21/57 |
| | | | 713/193 |
| 2006/0015717 A1 | 1/2006 | Liu et al. | |
| 2006/0161761 A1 | 7/2006 | Schwartz et al. | |
| 2006/0185017 A1* | 8/2006 | Challener | ............. G06F 21/565 |
| | | | 726/24 |
| 2009/0307499 A1* | 12/2009 | Senda | ...................... G06F 21/57 |
| | | | 713/187 |
| 2012/0204024 A1* | 8/2012 | Augenstein | ......... G06F 11/1453 |
| | | | 713/150 |
| 2014/0115343 A1* | 4/2014 | Ohhashi | .................. G06F 21/57 |
| | | | 713/187 |
| 2016/0226657 A1* | 8/2016 | Thom | .................... H04L 9/3234 |
| 2017/0364911 A1* | 12/2017 | Landrok | ............... G06Q 20/42 |

\* cited by examiner

METHOD FOR VERIFYING FORGERY AND FALSIFICATION OF EXECUTABLE FILE IN IMAGE FORMING APPARATUS AND IMAGE FORMING APPARATUS USING SAME

BACKGROUND ART

When an image forming apparatus is restarted by being turned on or reset, the image forming apparatus goes through a boot process. The boot process includes operations of loading an operating system (OS) or making hardware included in the image forming apparatus enter a usable state.

The image forming apparatus needs to verify forgery or falsification of an execution file to check whether the execution file is changed due to a malicious code from an external source.

BRIEF DESCRIPTION OF DRAWINGS

The above and other aspects, features, and advantages of certain examples of the disclosure will be more apparent from the following description taken in conjunction with the accompanying drawings, in which.

Throughout the drawings, it should be noted that like reference numbers are used to depict the same or similar elements, features, parts, components, and structures.

DETAILED DESCRIPTION OF EXAMPLES

Hereinafter, various examples will be described with reference to the drawings. The examples described hereinafter may, however, be embodied in many different forms. In the following description, well-known functions or constructions are not described in detail for clarity of description when it is determined that they are well known to those of ordinary skilled in the art.

It will be understood that when an element is referred to as being "connected to" or "coupled to" another element, it may be "directly connected or coupled" to the other element, or "indirectly connected or coupled" to the other element, such as being "electrically connected to" the other element, with intervening elements therebetween. It will be further understood that the terms "comprises," "comprising," "includes," and/or "including" when used herein, specify the presence of components, but do not preclude the presence or addition of one or more other components, unless otherwise specified.

In addition, while such terms as "first," "second," etc., used herein may be used to describe various components, such components are not to be limited to the above terms. The above terms are used only to distinguish one component from another.

In the following description, an "image forming job" may refer to various jobs related to an image (e.g., printing, copying, scanning, or faxing) including forming of an image or creation/storage/transmission of an image file. A "job" may refer to not only an image forming job, but also include a series of processes of performing an image forming job.

In addition, an "image forming apparatus" may refer to all types of apparatus that may perform an image forming job like a printer, a copier, a scanner, a fax machine, a multi-function printer (MFP), a display apparatus, etc.

A "hard copy" may refer to an operation of outputting an image on a print medium like paper, etc. A "soft copy" may refer to an operation of outputting an image on a display apparatus like a TV, a monitor, etc. as well as an operation of outputting an image to a memory device.

"Contents" may refer to any type of data like a photograph, an image, a document file, etc. which may be printed in an image forming job.

"Print data" may refer to data converted into a format that may be printed by a printer.

A "scan file" may refer to a file created by scanning an image by using a scanner.

A "user" may refer to a person performing an operation related to an image forming job by using an image forming apparatus or a device wired or wirelessly connected to the image forming apparatus. In addition, a "manager" may refer to a person having an authority of accessing all functions and systems of the image forming apparatus. The "manager" and the "user" may be a same person.

Figure 1:
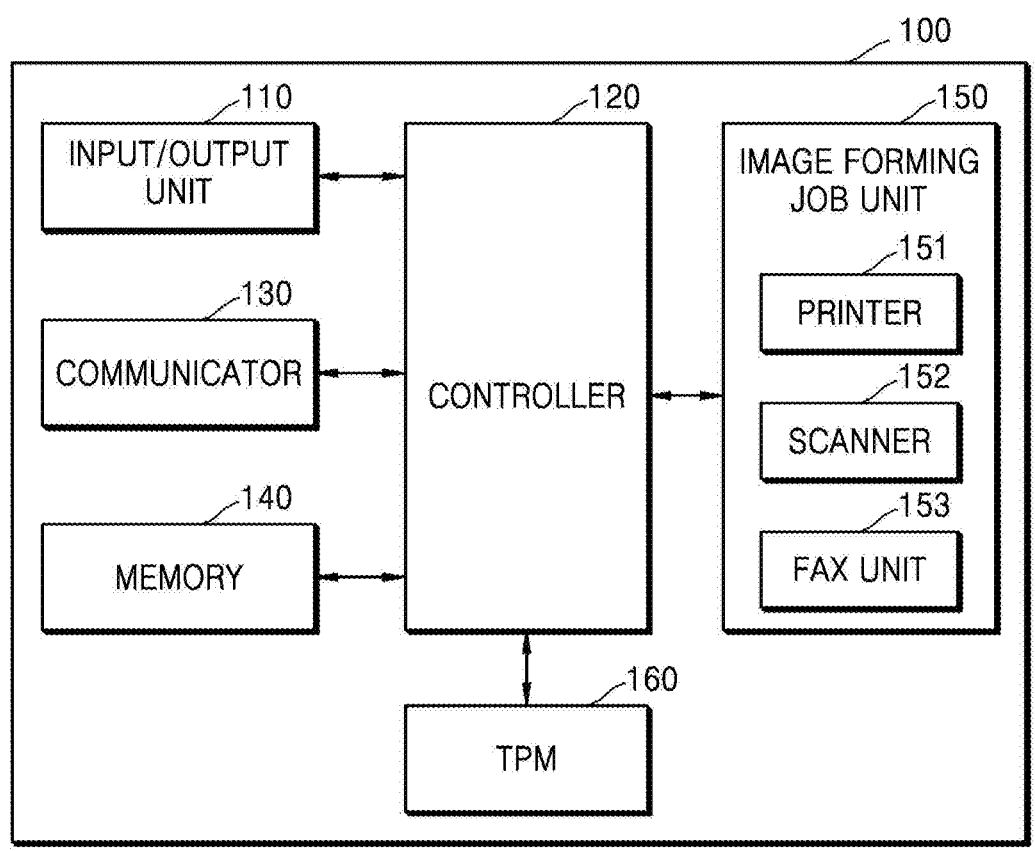
FIG. 1 is a diagram illustrating a configuration of an image forming apparatus, according to an example.

FIG. 1 is a diagram illustrating a configuration of an image forming apparatus according to an example.

Referring to FIG. 1, an image forming apparatus 100 may include an input/output unit 110, a controller 120, a communicator 130, a memory 140, and an image forming job unit 150. Although not illustrated, the image forming apparatus 100 may further include a power unit configured to supply power to each element.

The input/output unit 110 may include an input unit configured to receive an input of an image forming job performed by a user, and an output unit configured to display information about a result of performing the image forming job, a state of the image forming apparatus 100, or the like. For example, the input/output unit 110 may include an operation panel configured to receive a user input and a display panel configured to display a screen.

For example, the input unit may include an apparatus that may receive various types of user input, like a keyboard, a physical button, a touchscreen, a camera, a microphone, etc. In addition, the output unit may include, for example, a display panel, a speaker, or the like. However, the input/output unit 110 is not limited thereto, and may include an apparatus configured to support various inputs and outputs.

The controller 120 may control an operation of the image forming apparatus 100 and include at least one processor like a central processing unit (CPU), etc. The controller 120 may control other elements included in the image forming apparatus 100 to perform an operation corresponding to a user input received via the input/output unit 110. The controller 120 may include at least one specialized processor corresponding to each function or be a processor having a form in which functions are integrated.

For example, the controller 120 may execute a program stored in the memory 140, read data or a file stored in the memory 140, or store a new file in the memory 140.

The communicator 130 may perform wired or wireless communication with another device or network. To do so, the communicator 130 may include a communication module, such as a transceiver, supporting at least one of various wired or wireless communication methods. For example, the communication module may have a form of a chipset or be a sticker/barcode (e.g., a sticker including a near field communication (NFC) tag) including information needed for communication.

The wireless communication may include, for example, at least one of wireless fidelity (Wi-Fi), Wi-Fi Direct, Bluetooth, an ultra-wide band (UWB), NFC, etc. The wired communication may include, for example, at least one of a universal serial bus (USB), a high-definition multimedia interface (HDMI), etc.

The communicator 130 may be connected to an external apparatus arranged outside the image forming apparatus 100 and transceive a signal or data from/to the external apparatus.

Figure 2:
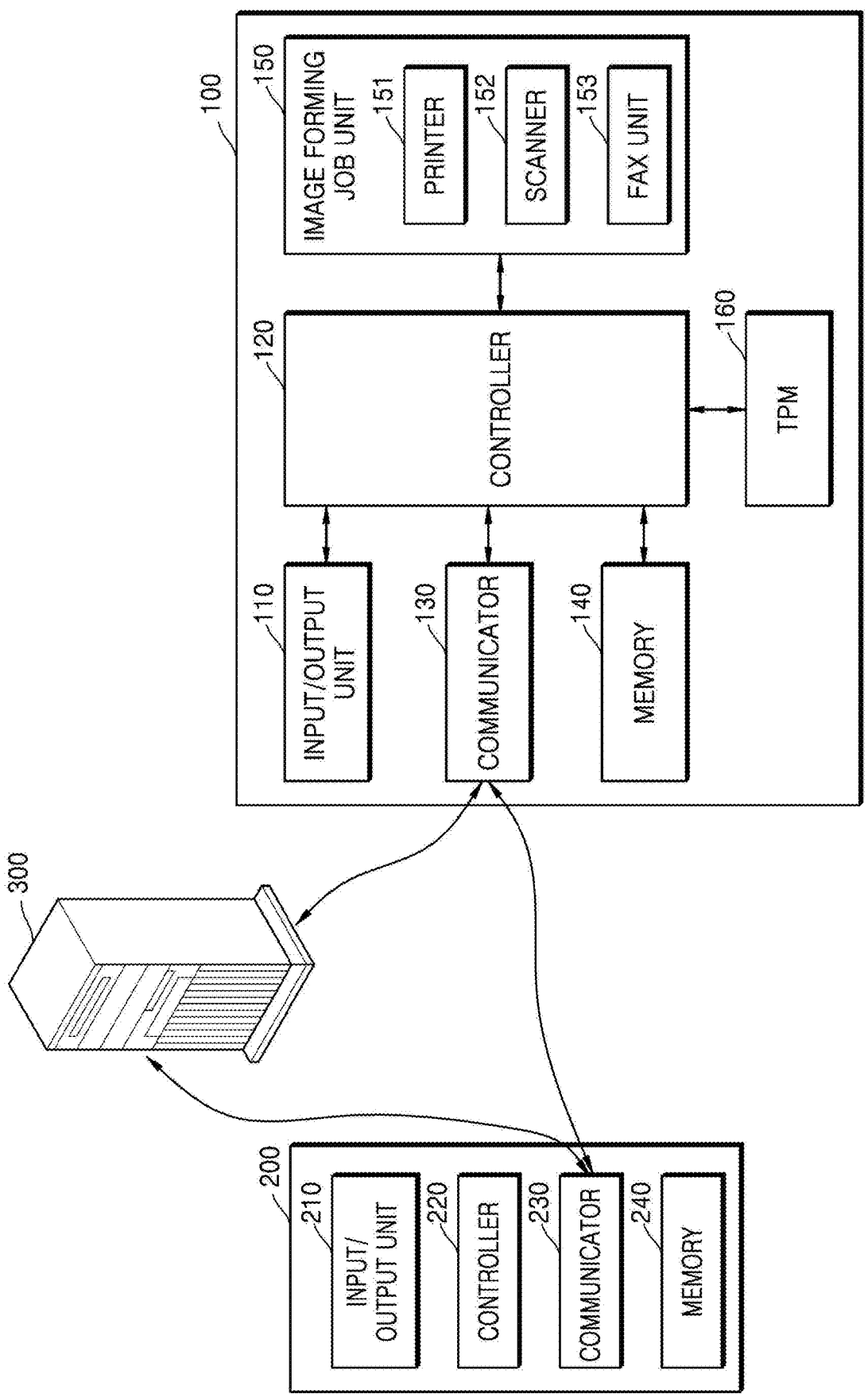
FIG. 2 is a diagram illustrating an image forming apparatus connected to an external apparatus or a server, according to an example.

FIG. 2 is a diagram illustrating an image forming apparatus connected to an external apparatus or a server, according to an example.

Referring to FIG. 2, the image forming apparatus 100 is connected to an external apparatus 200 via the communicator 130. When a signal or data is received from the external apparatus 200, the communicator 130 may deliver the signal or data to the controller 120. Alternatively, when a signal or data is generated from the controller 120, the communicator 130 may transmit the signal or data to the external apparatus 200. For example, when the communicator 130 receives a print instruction signal and print data from the external apparatus 200, the controller 120 may output the received print data via a printer 151.

As shown in FIG. 2, the external apparatus 200 may include an input/output unit 210, a controller 220, and a communicator 230, and a memory 240. The controller 220 may execute a program stored in the memory 240 and transmit a signal or data resulting from the execution of the program to the image forming apparatus 100 via the communicator 230, thereby controlling an image forming job.

The external apparatus 200 may include, for example, a smartphone, a tablet PC, a PC, a home appliance, a medical device, a camera, a wearable apparatus, or the like.

The communicator 130 may be connected to a server 300 and transceive a signal or data from/to the server 300. In addition, the communicator 130 may be connected to the external apparatus 200 via the server 300. That is, the communicator 130 included in the image forming apparatus 100 may transceive a signal or data with communicator 230 in the external apparatus 200 via the server 300.

Referring again to FIG. 1, various types of data including a program, like an application or a file, etc. may be installed or stored in the memory 140. The controller 120 may access and use the data stored in the memory 140 or store new data in the memory 140. The controller 120 may execute the program installed in the memory 140. When an application is received from an external source via the communicator 130, the controller 120 may install the application in the memory 140.

The image forming job unit 150 may perform an image forming job like printing, scanning, faxing, or the like.

The image forming job unit 150 may include the printer 151, a scanner 152, and a fax unit 153. However, some of the elements described above may not be included or other types of elements configured to perform the image forming job may be further included as needed.

The printer 151 may form an image on a recording medium by using various types of printing method such as an electrophotographic printing method, an inkjet printing method, a thermal transferring printing method, a thermal printing method, or the like.

The scanner 152 may emit light onto a document and receive light reflected from the document, thereby reading an image recorded on the document. For example, a charge-coupled device (CCD), a contact-type image sensor (CIS), or the like may be used as an image sensor reading an image from the document. The scanner 152 may have a flatbed structure in which the original is arranged on a fixed location and the image sensor moves and reads an image, a document feeding structure in which the image sensor is arranged on a fixed location and the original is fed, or a structure in which the flatbed structure is combined with the document feeding structure.

The fax unit 153 may share an image scanning element with the scanner 152 and an element for printing a received file with the printer 151. The fax unit 153 may transmit a scanned file to a destination or receive a file from an external source.

A trusted platform module (TPM) 160 may securely generate an encryption key and store the generated encryption key. The TPM 160 may generate the encryption key by using a hash value for an operating system (OS) kernel image. By using the encryption key generated by the TPM 160 to perform an integrity test on an execution file, integrity may be more strongly ensured compared to when an integrity test for determining a hash value for the execution file is performed.

The above-described elements of the image forming apparatus 100 may be named differently. Additionally, the image forming apparatus 100 may include at least one of the above-described elements, may not include some of the elements, or may include additional elements.

Figure 3:
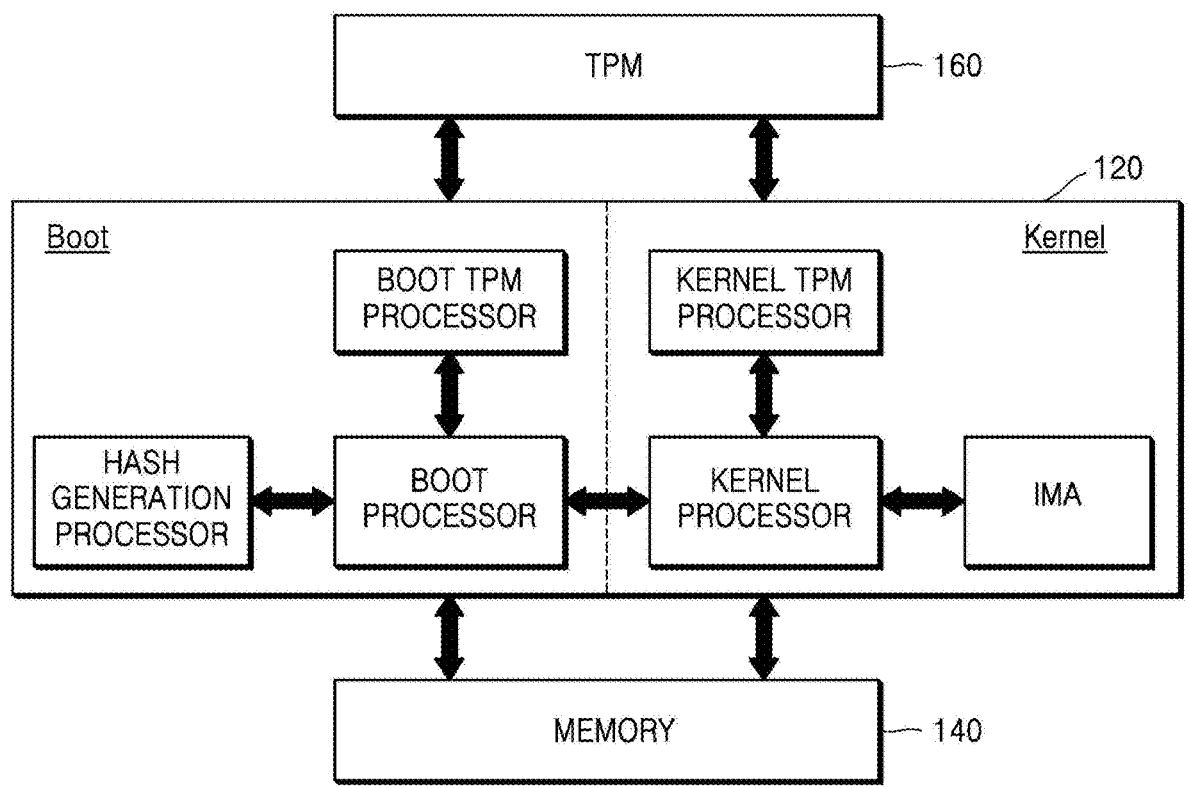
FIG. 3 is a diagram for explaining a process of an image forming apparatus for verifying forgery or falsification of an execution file, according to an example.

FIG. 3 is a diagram for explaining a process of an image forming apparatus for verifying forgery or falsification of an execution file, according to an example.

Referring to FIG. 3, the memory 140 may store an OS kernel image, and be a non-volatile storage apparatus. The memory 140 may store a computer-executable instruction.

The controller 120 may include a processor in each functional block, but is not limited thereto. Unlike in FIG. 3, the controller 120 may be embodied as a processor that may perform several functions or be embodied to have a form into which some of the blocks shown in FIG. 3 are integrated.

The controller 120 may be divided into a boot part and a kernel part. In FIG. 3, the boot part may include a boot processor, a boot TPM processor, and a hash generation processor. The kernel part may include a kernel processor, a kernel TPM processor, and an integrity measurement architecture (IMA).

The controller 120 may include at least one processor configured to verify forgery or falsification of the execution file based on an encryption key by executing the computer-executable instruction stored in the memory 140.

During a booting time of the image forming apparatus 100, at least one processor included in the controller 120 may receive and store an encryption key from the TPM 160 and set a hash value for the execution file by using the received encryption key. According to an IMA function provided by a Linux kernel in an example, during the booting time of the image forming apparatus 100, the at least one processor included in the controller 120 may generate the hash value for the execution file by using the received encryption key and store the generated hash value in a header of the execution file.

When the execution file is requested to be executed, the at least one processor included in the controller 120 may newly obtain a hash value for the execution file by using the stored encryption key, and determine when the hash value set during the booting time is changed. According to the IMA function provided by the Linux kernel, the at least one processor included in the controller 120 may determine whether the hash value stored in the header of the execution file during the booting time is identical to that obtained when the execution file is requested to be executed.

When it is determined that the hash value stored in the header of the execution file is not identical to that obtained when the execution file is requested to be executed, the at least one processor included in the controller 120 stops the execution of the execution file and indicates that the execution file is forged or falsified. The indication that the execution file is forged or falsified may include an image or audio notification via a user interface.

As described below, an operation of the controller 120 may be divided into respective operations of the boot part and the kernel part.

With respect to the operation of the boot part, the boot processor may read a kernel image from the memory 140 and control operations of the boot part. The hash generation processor calculates a hash value by using the kernel image. The boot TPM processor controls the hash value calculated by the hash generation processor to be transmitted to and stored in the TPM 160.

With respect to the operation of the kernel part, the kernel processor may control operations of the kernel part and determine data in the kernel part. The kernel TPM processor may control the TPM 160 and thereby read an encryption key from the TPM 160. The IMA may determine the hash value for the execution file and thereby perform an integrity test on the execution file, that is, verify forgery or falsification of the execution file.

In an example, upon a request by the external apparatus 200, when the at least one processor included in the controller 120 obtains the encryption key to be transmitted from the TPM 160 to the external apparatus 200, the TPM 160 may transmit the obtained encryption key to the external apparatus 200 via the communicator 130 so that the external apparatus 200 verifies forgery or falsification of the execution file according to an IMA function provided by a Linux kernel in the external apparatus 200.

The TPM 160 may generate an encryption key by using a hash value for the OS kernel image. During the booting time of the image forming apparatus 100, the TPM 160 may generate an encryption key by using the hash value for the OS kernel image and a random value generated by the TPM 160 and store the generated encryption key in a predetermined area of the TPM 160. In addition, the TPM 160 may generate an encryption key by using one of an electronic signature value generated by the TPM 160 and unique device information.

The boot part may generate the hash value for the OS kernel image and the TPM 160 may create an encryption key for the IMA by using the hash value for the OS kernel image to form a security chain between a boot, a kernel, and a file system and thereby provide a stronger security function than that of the IMA.

Figure 4:
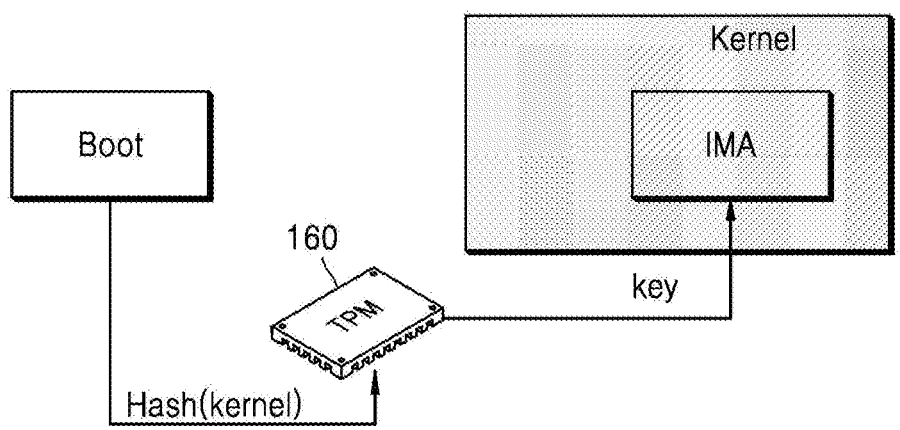
FIG. 4 is a diagram for explaining a process of setting a hash value for an execution file by using an encryption key generated by a trusted platform module (TPM) during a booting time of an image forming apparatus, according to an example.

FIG. 4 is a diagram for explaining a process of setting a hash value for an execution file by using an encryption key generated by the TPM during a booting time of an image forming apparatus, according to an example.

Referring to FIG. 4, as part of a booting process of the image forming apparatus 100, the boot part of the controller 120 reads a kernel image from the memory 140 and generates a hash value for the kernel image. The generated hash value is stored in a predetermined area of the TPM 160.

The TPM 160 generates an encryption key by using the hash value for the kernel image and a random value generated by the TPM 160, and stores the encryption key in the area of the TPM 160.

When a control authority is transferred from the boot part to the kernel part, the kernel part of the controller 120 reads the encryption key stored in the TPM 160 and transmits the read encryption key to the IMA. When the IMA receives the encryption key, the IMA stores the encryption key in the area of the IMA, calculates the hash value for the execution file by using the encryption key, and stores the hash value in an inode, that is, in a header of the execution file.

When a hash setting element of the IMA stores all hash values for execution files in respective headers, a control authority for executing a program is transmitted to an application controller (not shown) and the program is ready to be used by a user.

Figure 5:
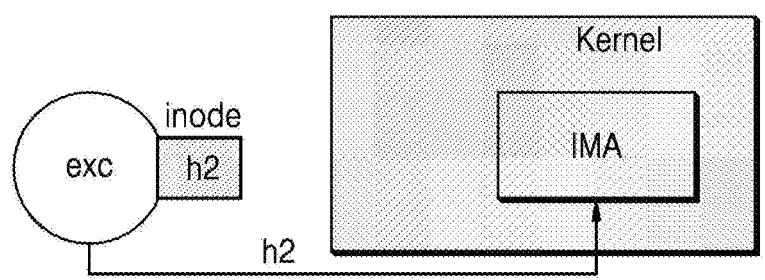
FIG. 5 is a diagram for explaining a process of, when an execution file is requested to be executed, determining whether a hash value for the execution file set during a booting time of an image forming apparatus is changed, according to an example.

FIG. 5 is a diagram for explaining a process of, when an execution file is requested to be executed, determining whether a hash value for the execution file set during a booting time of an image forming apparatus is changed, according to an example.

Referring to FIG. 5, when the execution file is requested to be executed, the IMA newly obtains a hash value for the execution file by using an encryption key stored in the IMA and determines whether the hash value set during the booting time is changed. That is, the IMA may determine whether a hash value stored in a header of the execution file during the booting time is identical to that obtained when the execution file is requested to be executed, thus determining whether integrity of the execution file is damaged or otherwise forged or falsified.

Figure 6:
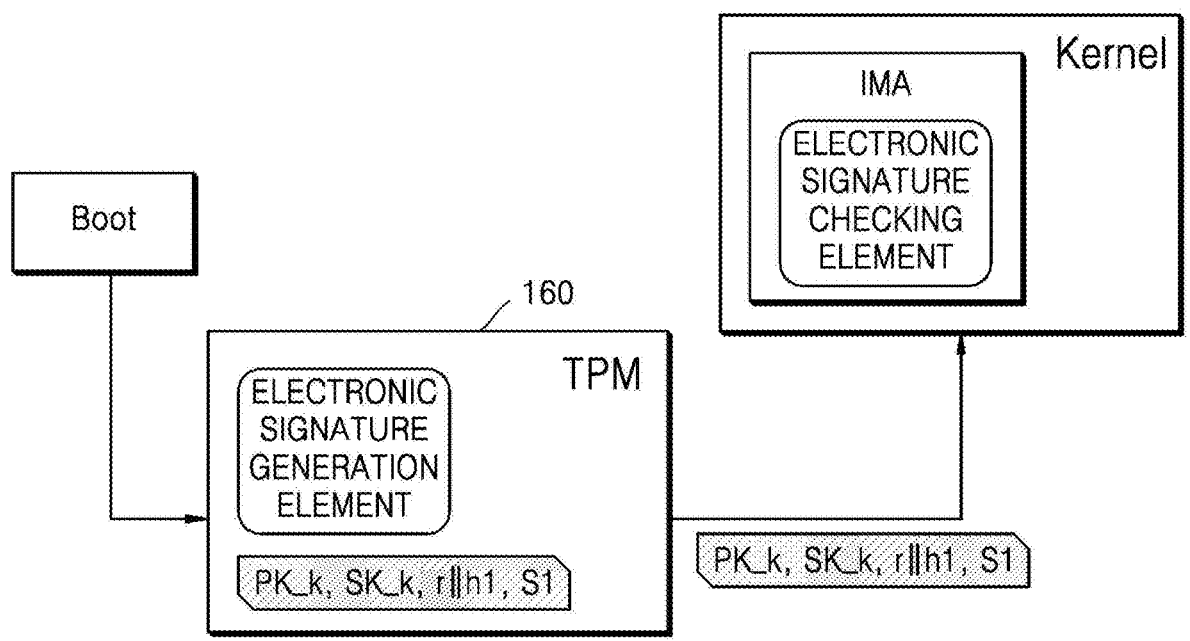
FIG. 6 is a diagram for explaining a process of a TPM for generating an encryption key by further using an electronic signature value and setting a hash value for an execution file during a booting time of an image forming apparatus, according to an example.

FIG. 6 is a diagram for explaining a process of a TPM for generating an encryption key by further using an electronic signature value and setting a hash value for an execution file during a booting time of an image forming apparatus, according to an example.

Referring to FIG. 6, as part of a booting process of the image forming apparatus 100, the boot part of the controller 120 reads a kernel image from the memory 140 and generates a hash value for the kernel image. The generated hash value is stored in a predetermined area of the TPM 160.

The TPM 160 generates a pair of electronic signature keys PK_k and SK_k by using an electronic signature generation element and generates a hash value using an electronic signature, that is, an electronic signature value S1 by using a hash value h1 for the kernel image and a random value r generated by the TPM 160. The TPM 160 stores the electronic signature value S1 in a predetermined area of the TPM 160. The TPM 160 stores and transmits "[a pair of electronic signature keys, a message, a signature]=[PK_k, SK_k, r∥h1, S1]" to the IMA in the kernel part.

When a control authority is transferred from the boot part to the kernel part, the kernel part of the controller 120 reads and transfers the pair of electronic signature keys, the message, and the signature value stored in the TPM 160 to the IMA. When the IMA receives the encryption key, the IMA verifies legitimacy of the signature and calculates and stores the hash value and the signature value for the execution file in an inode, that is, in a header of the execution file. For example, after the IMA verifies the legitimacy of the signature in (PK_k, r∥h1, S1) of "[the pair of electronic signature keys, the message, the signature]=[PK_k, SK_k, r∥h1, S1]," when "S1" is a correct signature, a hash value for the execution file, "hash(exc)=ef1" is calculated by using "SK_k" and is shortened to have a certain length. An electronic signature value "Sig(SK_k, r∥ef1)=S2" is calculated, and "[PK_k, r, S2]" or "[S2]" is stored in the inode of the execution file.

When the hash setting element of the IMA stores all electronic signature values for execution files in respective headers of the execution file, a control authority for executing a program is transferred to an application controller (not shown) so that the program is ready to be used by a user.

Figure 7:
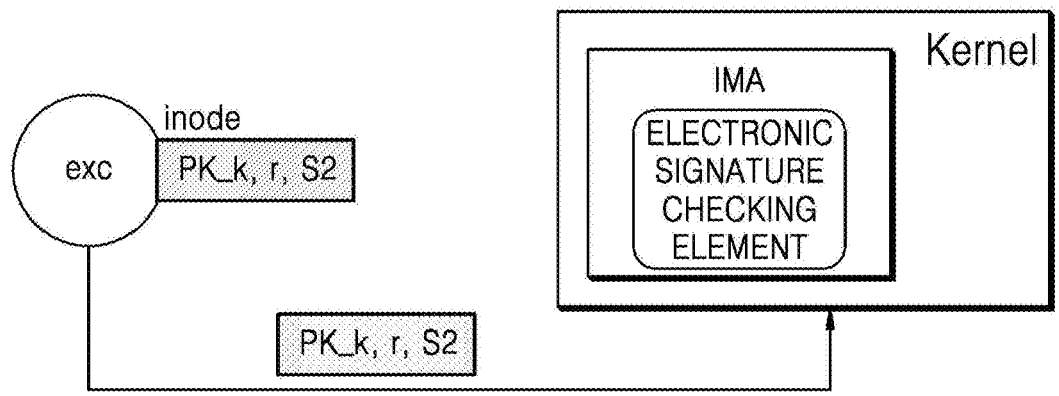
FIG. 7 is a diagram for explaining a process of, when an execution file is requested to be executed, determining whether a hash value for the execution file generated using an electronic signature and set during a booting time of an image forming apparatus is changed, according to an example.

FIG. 7 is a diagram for explaining a process of, when an execution file is requested to be executed, determining whether a hash value for the execution file generated using an electronic signature and set during a booting time of an image forming apparatus is changed, according to an example.

Referring to FIG. 7, when an execution file is requested to be executed, the IMA newly obtains a hash value using an electronic signature of the execution file by using the encryption key stored in the IMA and determines whether the hash value using the electronic signature of the execution file, wherein the hash value is set during the booting time, is changed. That is, the IMA may determine whether integrity of the execution file is damaged, forged, or falsified by determining whether the hash value using an electronic signature, the hash value stored in a header of the execution file during the booting time, is identical to the hash value using the electronic signature wherein the hash value is obtained when the execution file is requested to be executed.

Figure 8:
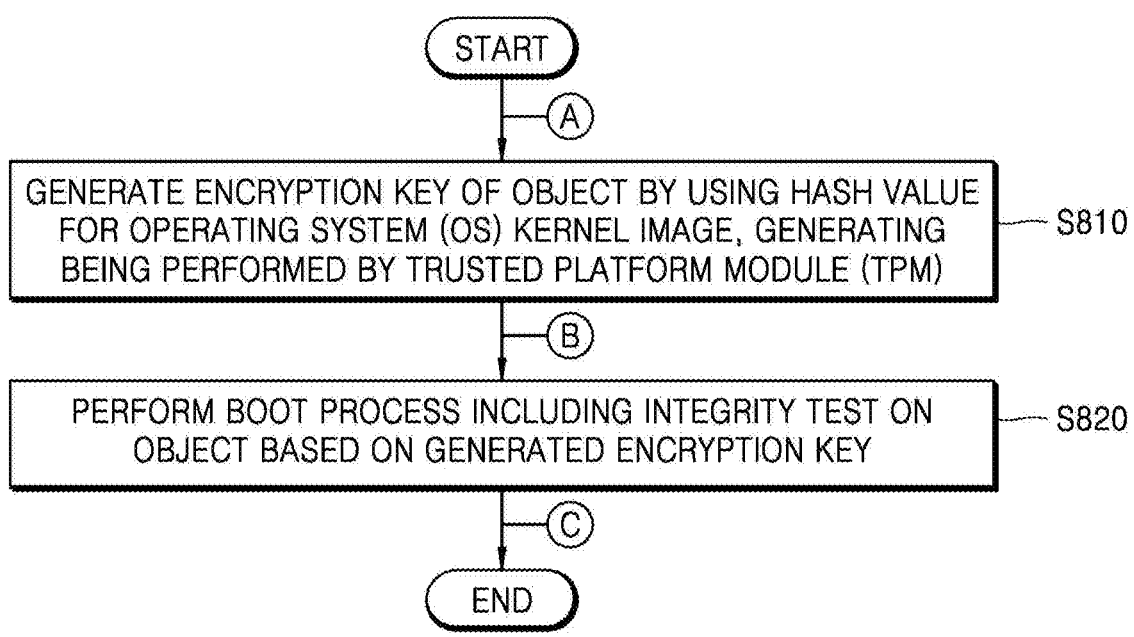
FIG. 8 is a flowchart of a method of an image forming apparatus for verifying forgery or falsification of an execution file, according to an example.

FIG. 8 is a flowchart of a method of an image forming apparatus for verifying forgery or falsification of an execution file according to an example.

Descriptions provided above may be applied to the method of verifying forgery or falsification of an execution file, the verifying being performed by the image forming apparatus 100 even when the descriptions are not provided here again.

Referring to FIG. 8, in the image forming apparatus 100, the TPM 160 generates an encryption key by using a hash value for an OS kernel image in operation S810.

In operation S820, the image forming apparatus 100 determines forgery or falsification of an execution file based on the generated encryption key. As an example, the image forming apparatus 100 may perform a boot process including an integrity test on an object using the generated encryption key.

Figure 9:
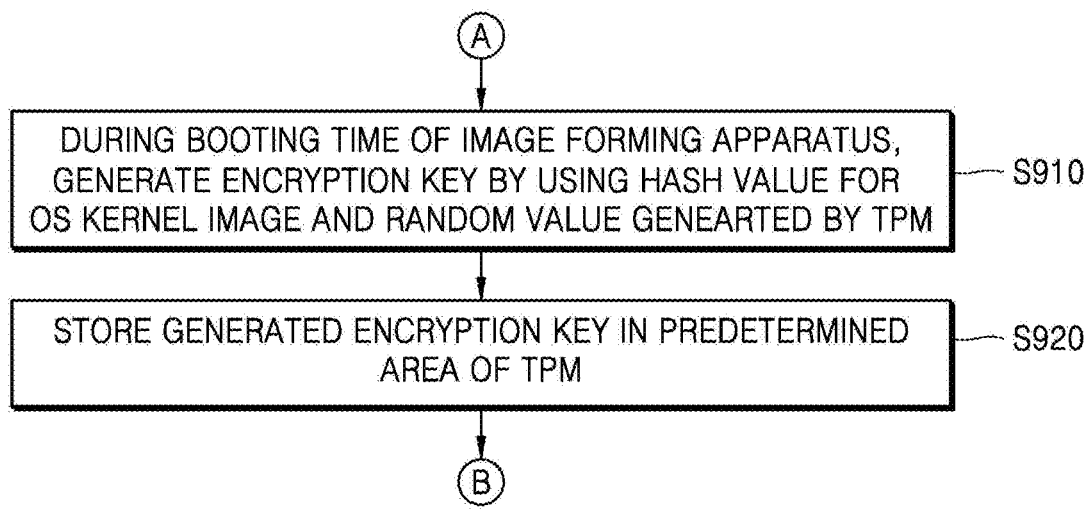
FIG. 9 is a flowchart of a method of a TPM for generating an encryption key in a process when an image forming apparatus verifies forgery or falsification of an execution file, according to an example.

FIG. 9 is a flowchart of a method of a TPM for generating an encryption key in a process when an image forming apparatus verifies forgery or falsification of an execution file, according to an example.

Referring to FIG. 9, the image forming apparatus 100 may generate an encryption key by using a hash value for an OS kernel image and a random value generated by the TPM 160 during a booting time of the image forming apparatus 100 in operation S910. The image forming apparatus 100 may generate the encryption key by further using one of an electronic signature value generated by the TPM 160 or unique device information.

In operation S920, the image forming apparatus 100 may store the encryption key generated by the TPM 160 in a predetermined area of the TPM 160.

Figure 10:
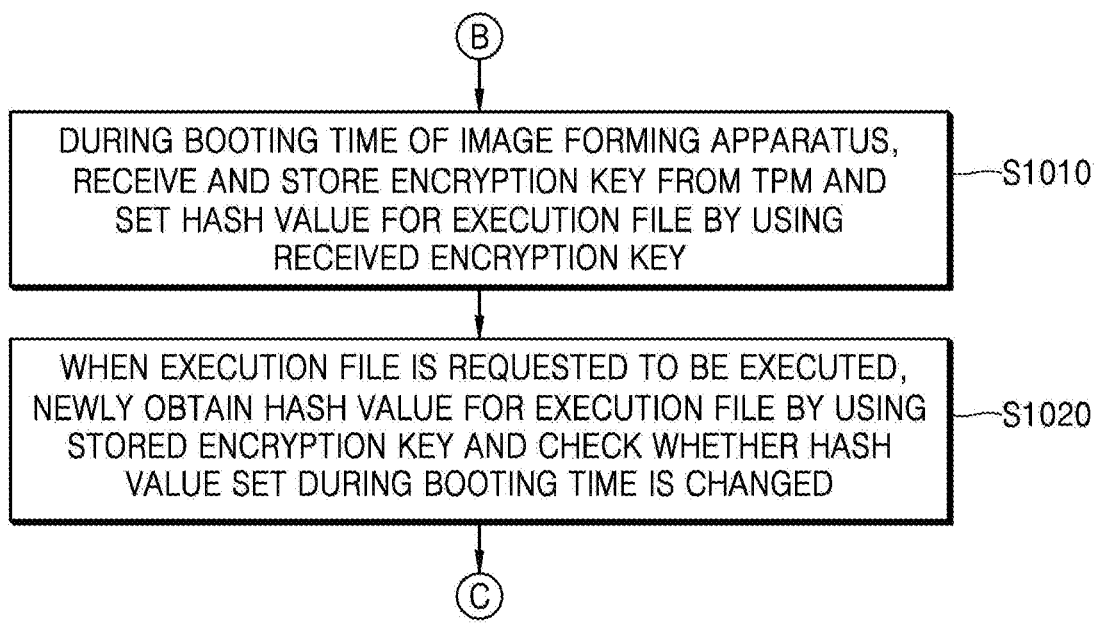
FIG. 10 is a flowchart of a process of verifying forgery or falsification of an execution file based on an encryption key generated in a process when an image forming apparatus verifies the forgery or falsification of the execution file, according to an example.

FIG. 10 is a flowchart of a process of verifying forgery or falsification of an execution file based on an encryption key generated in a process when an image forming apparatus verifies the forgery or falsification of the execution file, according to an example.

Referring to FIG. 10, during a booting time of the image forming apparatus 100, the image forming apparatus 100 may receive and store an encryption key from the TPM 160 and set a hash value for an execution file by using the received encryption key in operation S1010. According to the IMA function provided by the Linux kernel, during the booting time of the image forming apparatus 100, the image forming apparatus 100 may generate the hash value for the execution file and store the generated hash value in a header of the execution file by using the received encryption key.

In operation S1020, when the execution file is requested to be executed, the image forming apparatus 100 may determine whether the hash value set during the booting time is changed, by newly obtaining a hash value for the execution file using the stored encryption key. According to the IMA function provided by the Linux kernel, the image forming apparatus 100 may determine whether the hash value stored in the header of the execution file during the booting time is identical to that obtained when the execution file is requested to be executed. As a result of the determining, when the image forming apparatus 100 determines that the hash value stored in the header of the execution file is not identical to that obtained when the execution file is requested to be executed, the image forming apparatus 100 may stop execution of the execution file and notify via a user interface that the execution file is damaged, forged, or falsified.

The above-described examples may be embodied in the form of a non-transitory computer-readable recording media for storing computer-executable instructions and data. At least one of the instructions and data may be stored in the form of a program code and, when executed by a processor, generate a predetermined program module and thereby perform a predetermined operation.

The non-transitory computer-readable recording media may include, for example, a magnetic storage media like a hard disk, etc., optical recording media selected from CD, DVD, etc., or a memory included in a server that may be accessed via a network. For example, the computer-readable recording media may be at least one of the memory 140 included in the image forming apparatus 100 and a memory (not shown) included in the input/output unit 110. Alternatively, the computer-readable recording media may be the memory 240 included in the external apparatus 200 connected to the image forming apparatus 100 via a network.

While the examples have been described, it will be understood by those skilled in the art that various changes in form and details may be made therein without departing from the spirit and scope of the examples as defined by the appended claims. The examples are not to be considered in a descriptive sense only and are not for purposes of limitation. Therefore, the scope of the disclosure is defined not by the detailed description of the disclosure but by the appended claims, and all differences within the scope will be construed as being included in the disclosure.

What is claimed is:

1. An image forming apparatus comprising:
    a memory to store an operating system (OS) kernel image and to store a computer-executable instruction;
    at least one processor to read the OS kernel image from the memory and to generate a hash value for the OS kernel image; and
    a trusted platform module (TPM) to store the hash value for the OS kernel image, to generate an encryption key by using the hash value for the OS kernel image, and to store the encryption key,
    wherein the at least one processor is further to execute the computer-executable instruction to:
        verify forgery or falsification of an execution file based on the encryption key;
        during a booting time of the image forming apparatus, receive and store the encryption key from the TPM and set a hash value for the execution file by using the received encryption key;
        when the execution file is requested to be executed, determine whether the hash value set during the booting time is changed, by newly obtaining a hash value for the execution file by using the stored encryption key; and
        according to an integrity measurement architecture (IMA) function provided by a Linux kernel, during the booting time of the image forming apparatus, generate the hash value for the execution file by using the received encryption key and store the generated hash value in a header of the execution file.

2. The image forming apparatus of claim 1, wherein the at least one processor further executes the computer-executable instruction to, according to the IMA function provided by the Linux kernel, determine whether the hash value stored in the header of the execution file during the booting time is identical to that obtained when the execution file is requested to be executed.

3. The image forming apparatus of claim 2, wherein the at least one processor further executes the computer-executable instruction to, when it is determined that the hash value stored in the header of the execution file is not identical to that obtained when the execution file is requested to be executed, stop execution of the execution file and notify that the execution file is forged or falsified.

4. The image forming apparatus of claim 1, wherein, during a booting time of the image forming apparatus, the TPM generates the encryption key by using the hash value for the OS kernel image and a random value generated by the TPM and stores the generated encryption key in a predetermined area of the TPM.

5. The image forming apparatus of claim 4, wherein the TPM generates the encryption key by further using at least one of an electronic signature value generated by the TPM or unique device information.

6. The image forming apparatus of claim 1, wherein the at least one processor further executes the computer-executable instruction to, upon a request by an external apparatus, obtain an encryption key to be transmitted from the TPM to the external apparatus, and
    the image forming apparatus further comprises a communicator to transmit the obtained encryption key to the external apparatus so that the external apparatus may verify forgery or falsification of the execution file according to an IMA function provided by a Linux kernel of the external apparatus.

7. A method of an image forming apparatus for verifying forgery or falsification of an execution file, the method comprising:
    storing an operating system (OS) kernel image in a memory of the image forming apparatus;
    reading the OS kernel image from the memory;
    generating a hash value for the OS kernel image;
    storing the hash value by a trusted platform module (TPM);
    generating an encryption key by using the hash value for the OS kernel image, the generating being performed by the TPM;
    storing the generated encryption key; and
    verifying forgery or falsification of an execution file based on the generated encryption key,
    wherein the verifying of the forgery or falsification comprises:
        during a booting time of the image forming apparatus, receiving and storing the encryption key from the TPM and setting a hash value for the execution file by using the received encryption key; and
        when the execution file is requested to be executed, determining whether the hash value set during the booting time is changed by newly obtaining a hash value for the execution file by using the stored encryption key, and
    wherein the setting of the hash value for the execution file comprises:
        according to an integrity measurement architecture (IMA) function provided by a Linux kernel, during the booting time of the image forming apparatus, generating the hash value for the execution file by using the received encryption key; and
        storing the generated hash value in a header of the execution file.

8. The method of claim 7, wherein the determining of whether the hash value set during the booting time is changed comprises, according to the IMA function provided by the Linux kernel, determining whether the hash value stored in the header of the execution file during the booting time is identical to that obtained when the execution file is requested to be executed.

9. The method of claim 7, wherein the generating of the encryption key comprises:

during a booting time of the image forming apparatus, generating the encryption key by using the hash value for the OS kernel image and a random value generated by the TPM; and storing the generated encryption key in a predetermined area of the TPM.

10. The method of claim 9, wherein the generating of the encryption key comprises generating the encryption key by further using at least one of an electronic signature value generated by the TPM or unique device information.

11. A non-transitory computer-readable recording medium having instructions recorded thereon for performing a method of verifying forgery or falsification of an execution file, the non-transitory computer-readable recording medium comprising:

instructions to store an operating system (OS) kernel image in a memory;

instructions to read the OS kernel image from the memory;

instructions to generate a hash value for the OS kernel image;

instructions to store the hash value by a trusted platform module (TPM);

instructions to generate an encryption key by using the hash value for the OS kernel image, the generating being performed by the TPM;

instructions to store the generated encryption key; and instructions to verify forgery or falsification of an execution file based on the generated encryption key, wherein the instructions to verify the forgery or falsification comprise:

instructions to, during a booting time of the image forming apparatus, receive and store the encryption key from the TPM and set a hash value for the execution file by using the received encryption key; and instructions to, when the execution file is requested to be executed, determine whether the hash value set during the booting time is changed by newly obtaining a hash value for the execution file by using the stored encryption key, and wherein the instructions to set the hash value for the execution file comprise:

instructions to, according to an integrity measurement architecture (IMA) function provided by a Linux kernel, during the booting time of the image forming apparatus, generate the hash value for the execution file by using the received encryption key; and instructions to store the generated hash value in a header of the execution file.

* * * * *